(12) United States Patent
Nauwelaerts

(10) Patent No.: US 6,319,578 B1
(45) Date of Patent: *Nov. 20, 2001

(54) TAPE WITH A REINFORCED OR NON-REINFORCED SELF-ADHESIVE ADHESION STRIP

(75) Inventor: Frans Nauwelaerts, Bareldreef (BE)

(73) Assignee: Varitape B.v.B.a. (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,288

(22) Filed: Dec. 23, 1996

(51) Int. Cl.$^7$ ........................................................ B32B 3/24
(52) U.S. Cl. .................. 428/40.1; 248/549; 428/41.7; 428/41.8; 428/42.1; 428/42.2; 428/42.3; 428/43
(58) Field of Search ................... 428/40.1, 41.7, 428/41.8, 42.1, 42.2, 42.3, 43, 40.3; 248/549

(56) References Cited

U.S. PATENT DOCUMENTS

| | | | |
|---|---|---|---|
| 2,191,704 | * 2/1940 | Bennet | 428/40.1 |
| 2,552,664 | * 5/1951 | Burdine | 428/138 |
| 2,860,081 | * 11/1958 | Eiken | 428/138 |
| 3,411,978 | * 11/1968 | Frohbach | 428/42.3 |
| 3,770,559 | * 11/1973 | Jackson | 428/40.3 |
| 3,885,768 | * 5/1975 | Frye | 428/40.1 |
| 3,999,949 | * 12/1976 | Andersson | 428/40.1 |
| 4,182,789 | * 1/1980 | Castelluzzo | 428/42.1 |
| 5,366,775 | 11/1994 | Kao | 428/40.1 |

* cited by examiner

Primary Examiner—Nasser Ahmad
(74) Attorney, Agent, or Firm—William A. Drucker

(57) ABSTRACT

The tape comprises a self-adhesive strip intended to be applied on an object, a backing strip covering one side of the adhesion strip and which is pulled off the adhesion strip after this strip is applied, additional means of adherence provided on the backing strip increasing the adhesive force between the backing strip and the adhesion strip and avoiding the curling of the latter when is applied.

8 Claims, 1 Drawing Sheet

TAPE WITH A REINFORCED OR NON-REINFORCED SELF-ADHESIVE ADHESION STRIP

BACKGROUND OF THE INVENTION FIELD OF THE INVENTION

The invention is for a tape on a roll or consisting of separate pieces cut in advance with by preference but not exclusively a self-adhesive adhesion strip which may or may not be reinforced and which may for example be made of butyl or another bituminous or rubbery material and which is intended to be used primarily for the installation of rubber sealing strips for example in and on car doors but which can also be used for other applications.

BRIEF DESCRIPTION OF THE PRIOR ART

Tape on a roll or tape consisting of separate pieces cut to size in advance and which contains a butyl, bituminous or rubbery adhesive adhesion strip on which a backing strip for example of plastic or paper, such as silicon paper is provided so that it can be removed, which adhesion strip may or may not be covered by a protective strip of plastic or paper such as silicon paper for the temporary protection of the adhesion strip is known.

To use the self-adhesive butyl, bituminous or rubbery adhesion strip on a roll or in separate pieces, the protective strip is removed from the adhesion strip, the adhesion strip is for example applied to a rubber sealing strip which is installed in or on a car door, after which the backing strip is removed.

It has proved that this tape has the disadvantage during use that both the protective strip and the backing strip start to curl and come away easily and prematurely from the tape. As a result it is possible that during attachment the adhesion strip sticks to surfaces for which it is not intended. At the same time air channels are created between the backing strip, the protective strip and adhesion strip, with the result that the quality of attachment of the adhesion strip will be reduced as result of drying and/or contamination with dust.

SUMMARY OF THE INVENTION

In order to remedy this a tape according to the main characteristic of the invention has been realized in which the backing strip is provided with additional means of adherence in order to make the adhesive force between the backing strip and the adhesion strip greater than that between the adhesion strip and the protective strip, so that not only does the protective strip always first come loose from the adhesion strip but that also the adhesion strip is prevented from curling and the creation of air channels between the various strips is avoided.

BRIEF DESCRIPTION OF THE DRAWINGS

By way of example, and without in any way being exhaustive, a more detailed description of some preferred embodiments of the tape according to the invention are described in more detail below. This description refers to the attached drawing where.

DESCRIPTION OF THE PREFERRED EMBODIMENT

Figure 1:
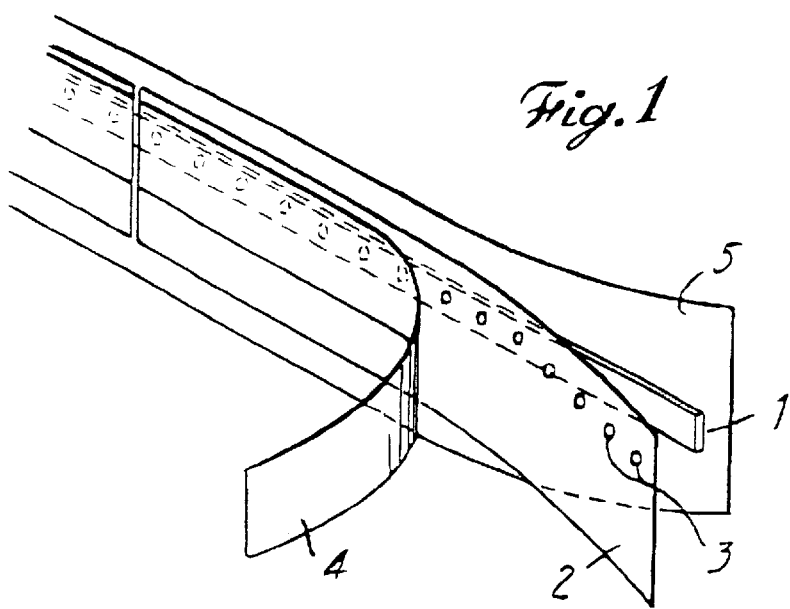
FIG. 1 shows part of a tape with for the sake of clarity the strips pulled loose.
Figure 2:
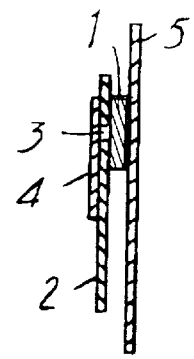
FIG. 2 shows an enlarged cross-section of the same tape.

In the embodiment of the tape shown in FIGS. 1 and 2, it will be noticed that the tape contains a self-adhesive butyl, bituminous or rubbery adhesion strip 1 intended for the flat and permanent gluing of an object in a suitable location, such as for example on rubber sealing strips prior to installation in and on motorcar doors. This adhesion strip is glued to a backing strip 2 made by preference from silicon paper in which perforations 3 have been provided which are covered on the rear side by an adhering strip 4. As a result the butyl or bituminous material of the adhesion strip adheres in the perforations 3 and to the adhering strip 4 and firm and adequate attachment of the adhesion strip 1 to the backing strip 2 is obtained. The face of the adhesion strip 1 is covered for protection by a protective strip 5. When separate pieces of adhesion strip are to be used, several adhesion strips with their backing and adhering strips are placed one behind the other on the same protective strip 5.

To apply a butyl, bituminous or rubbery adhesion strip 1 on any object whatsoever, the protective strip 5 is removed from the adhesion strip 1 coming loose from the backing strip 2 and without the adhesion strip starting to curl, which is a consequence of the special embodiment of the backing strip 2 with perforations 3 and adhering strip 4. After the adhesion strip 1 is firmly fixed, the backing strip 2 with the adhering strip 4 is easily removed.

Figure 3:
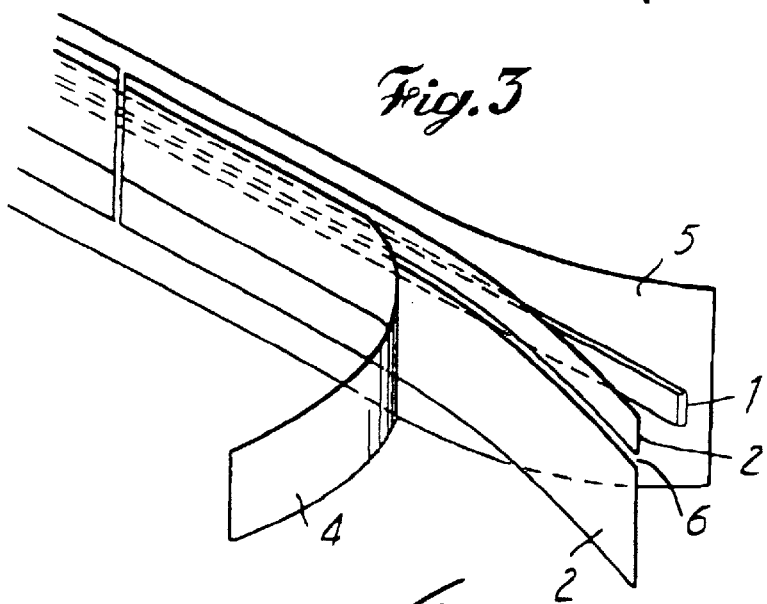
FIG. 3 shows part of a tape with for the sake of clarity the strips pulled loose, where use is made of a two-part backing strip.
Figure 4:
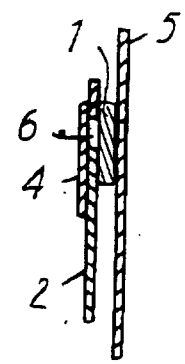
FIG. 4 shows a cross-section of the same tape.

In FIGS. 3 and 4 it will be noticed that the backing strip 2 consists of two separate sections which run along the lenght of the tape parallel at a distance from one another on the back of the butyl, bituminous or rubbery adhesion strip 1, so that a gap 6 is created which on the back is covered by an adhering strip 4. As a result the butyl or bituminous material of the adhesion strip lodges sufficiently firmly in the gap 6 and on the adhering strip 4. It goes without saying that use can also be made of a single backing strip 2 provided with a lengthways gap.

Figure 5:
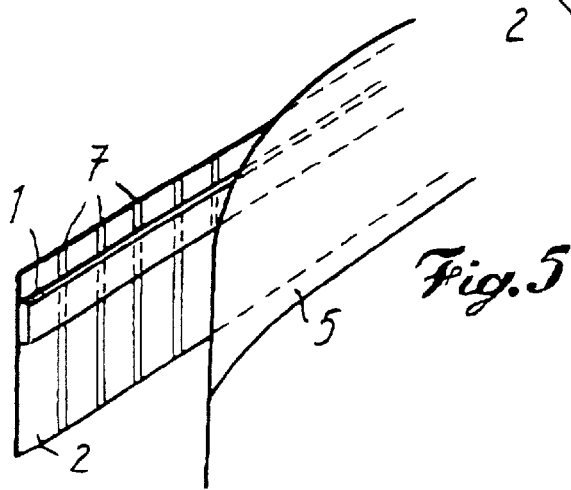
FIG. 5 shows part of a tape in its most simple embodiment with for the sake of clarity the strips pulled loose.
Figure 6:
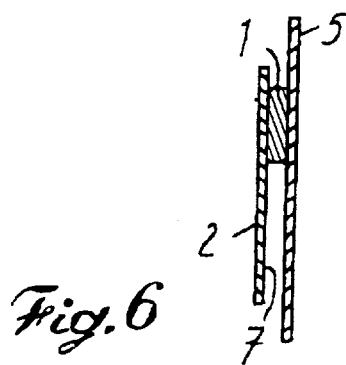
FIG. 6 shows a cross-section of the same tape.

In FIGS. 5 and 6 it will be seen that the tape may also consist of a butyl, bituminous or rubbery adhesion strip 1 applied to a backing strip 2 made by preference of silicone paper where several narrow lines 7 of the surface material have been removed from the silicon surface by mechanical, chemical or other means, so that the butyl or bituminous adhesion strip 1 becomes firmly attached to them, as is the case when perforations or gaps are used. The surface material can also be removed in the form of dots or circles.

It goes without saying that the additional means of attachment in accordance with the invention may assume any form and dimensions and that the material used, the colour, the dimensions and the number of the various parts of the tape may differ according to the desired purpose.

I claim:

1. An adhesive device which comprises:
   a self-adhesive adhesion strip for gluing of an object in a suitable location having a pair of opposing surfaces;
   a backing strip removably secured to one of said opposing surfaces, said backing strip have at least one aperture therein disposed directly over said adhesion strip;

an adhering strip disposed over said backing strip and contacting said adhesion strip through said at least one aperture to minimize curling of said adhesion strip; and a protective strip removably secured to and covering the other of said pair of opposing surfaces of said adhesion strip.

2. The adhesive device of claim 1 wherein said at least one aperture is a hole.

3. The adhesive device of claim 1 wherein said at least one aperture is a strip extending along said adhesion strip.

4. The adhesive device of claim 1 wherein said at least one aperture is a strip extending in a direction normal to said adhesion strip.

5. The adhesive device of claim 1 wherein said combination of said backing strip and said adhering strip provides an adhesive force with said adhesion strip greater than the adhesive force between said adhesion strip and said protective strip.

6. The adhesive device of claim 2 wherein said combination of said backing strip and said adhering strip provides an adhesive force with said adhesion strip greater than the adhesive force between said adhesion strip and said protective strip.

7. The adhesive device of claim 3 wherein said combination of said backing strip and said adhering strip provides an adhesive force with said adhesion strip greater than the adhesive force between said adhesion strip and said protective strip.

8. The adhesive device of claim 4 wherein said combination of said backing strip and said adhering strip provides an adhesive force with said adhesion strip greater than the adhesive force between said adhesion strip and said protective strip.

* * * * *